Nov. 20, 1962 W. E. MEAGHER 3,064,617
TRAILER MARKER
Filed Oct. 20, 1961
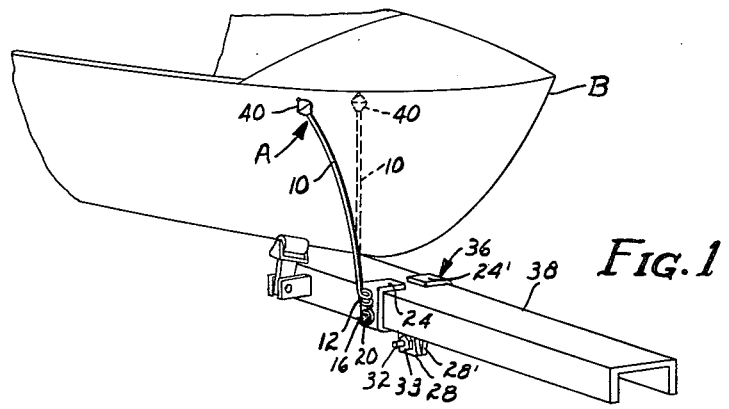
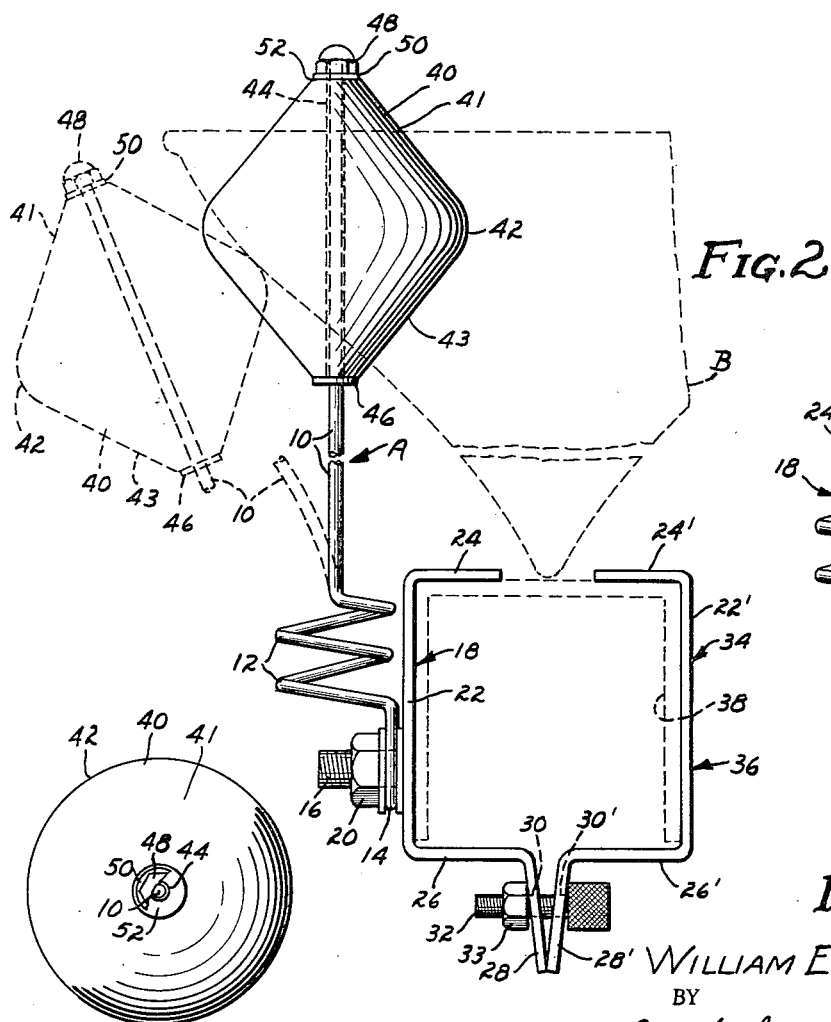
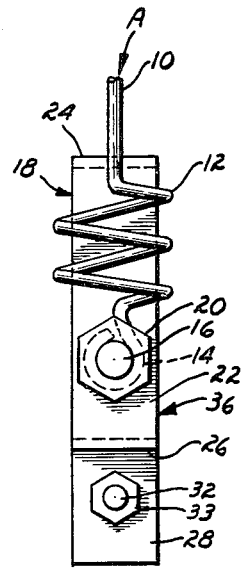
INVENTOR.
WILLIAM E. MEAGHER
BY
Caswell, Lagaard & Wicks
ATTORNEYS

# 3,064,617
TRAILER MARKER
William E. Meagher, 4538 Adair Ave. N., Minneapolis 22, Minn.
Filed Oct. 20, 1961, Ser. No. 146,476
4 Claims. (Cl. 116—28)

The invention relates broadly to an improvement in marker devices and more particularly to a marker device which is secured to the rear end of the frame of a boat trailer to indicate to the driver of an automobile towing the trailer the rearward limit of the trailer frame as a distinct aid in backing the trailer. In backing most present day trailers when empty the driver of the automobile cannot see the rear end of the trailer through the rear window and the only alternative is for the driver to hang out the side door as the automobile is backed. Such action leads to inefficient backing of the trailer and the same can become quite dangerous to the driver, the trailer and anyone standing close by.

It is an object of the invention to provide a trailer marker which is easily and removably secured to the rear end of a structural member of a trailer and which extends vertically therefrom, the top end of which is visible to the driver through the rear window of the automobile to which the trailer is attached.

It is also an object to provide a trailer marker which indicates the rearward limit of a trailer and which yields to the hull of a boat moved into position upon the trailer.

It is a further object to provide a trailer marker which automatically returns to a vertical position after the boat is removed from the trailer.

It is an additional object to provide a trailer marker having means which allows boats of varying hull design and dimension to displace the marker when on the trailer with no damage to the boat or to the marker.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 1 is a perspective view of a portion of the rear end member of a trailer with the marker mounted thereon, a portion of the bow of a boat shown in contact with the marker.

FIGURE 2 is an enlarged front elevational view of the marker mounted on a trailer structural member with the bow of a boat shown in broken lines and the marker shown in broken lines in a displaced position.

FIGURE 3 is a top plan view of the roller member as illustrated in FIGURE 2.

FIGURE 4 is a further enlarged side view of the clamp member with a portion of the flexible upright member shown.

Referring to the drawings in detail, the marker A includes the upright elongated flexible rod member 10 which has formed on the lower end thereof the convolutions 12 to thereby form a yieldable spring base for the upright member 10. The lower free end of the upright 10 is formed with a loop portion 14 through which the threaded stud 16 is inserted. The stud 16 is mounted on the half clamp portion 18, and the nut 20 securely fastens the loop portions 14 of the upright 10 to the half clamp portion 18.

The half clamp portion 18 includes the vertical side portion 22 terminating at the upper end in the right angular top portion 24. Formed at a right angle to the side portion 22 is the lower portion 26 which terminates in the depending flange portion 28 formed with a hole 30 which receive bolt 32 equipped with nut 33. The half clamp portion 34 is identical to portion 18 and the corresponding parts are indicated by the same number but with the addition of a prime mark, thus, "'".

The two half clamp portions 18 and 34 and bolt 32 make up the clamp 36 which allows the upright flexible member 10 to be secured to the rear end of the horizontal member 38 of a boat trailer.

Rotatably mounted on the upper end of the flexible upright 10 is the indicator member 40 shown in the form of a roller, the body of which is substantially in the formation of two opposed cones joined at the bases thereof, and presenting the upper conical angular surface 41 and the lower conical angular surface 43. The roller is arcuately formed at the juncture of the bases as at 42. The roller 40 is formed with a hole 44 extending through the same, the diameter of which is slightly greater than that of the upright 10 whereby the roller will freely rotate on the upright. A fixed stop or shoulder 46 is secured to the upright 10 which positions the roller upon the upper end of the upright 10. The roller 40 is secured on the upright 10 by means of the nut 48 with a washer 50 interposed between the nut 48 and the flattened portion 52 of the roller 40.

As heretofore mentioned, the marker A is mounted on a horizontal structural member of a trailer such as 38 at the rear end thereof, as illustrated in FIGURE 1. Without the boat B on the trailer, the driver of the automobile towing the trailer can very easily see the roller 40 out the rear window of the automobile. As a result the driver is thereby aided materially in backing the trailer, for he can ascertain the rear limit of the trailer. Without the device A, the driver, in the majority of boat trailers, cannot see the rear end of the trailer from the driver's seat through the rear window. The driver must, as a result, hang out the door of the car in an attempt to ascertain the position of the rear end of the trailer. Such action of the driver makes it difficult to handle the automobile properly.

When a boat, such as B, is loaded onto the trailer, the bow of the boat comes in contact with the marker A, and as a result of the construction of the marker, the same yields and is pushed out of the way. The yielding movement of the marker is aided by reason of the roller 40 which is rotated when in contact with the hull of the boat. This allows the marker to be easily by-passed. The angular formation of the roller 40 further allows more freedom of movement of the roller upon the hull of the boat as the boat is loaded onto the trailer, and in addition, the roller will not damage the hull. Due to the flexibility of the upright member 10 the same easily stays in a deformed position against the hull out of the way until the boat is unloaded when it again assumes an upright position for use as a guide in backing the trailer.

In addition, due to the flexibility of the member 10 and the construction of the roller 40, the marker A may be used with boats having varying hull formations and dimensions.

The invention is not to be understood as restricted to the details set forth since these may be modified within the scope of the appended claims without departing from the spirit and scope of the invention.

Having thus described the invention, what is claimed as new and desired to be secured by Letters Patent is:

1. In a trailer marker device, clamp means for connection with the structural member of a trailer, an elongated flexible member secured at its lower end to said clamp means, and a roller member rotatably mounted on the upper end of said flexible member adapted to rotate as a boat hull is moved against the same.

2. In a trailer marker device, clamp means for connection with the structural member of a trailer, an elongated flexible member having a coil spring formation on the lower end thereof, the lower end of said spring formation connected to said clamp means, and a roller member rotatably mounted on the upper end of said elongated flexible member adapted to rotate as the same is contacted by a boat hull moved onto the trailer.

3. In a trailer marker device, clamp means for connection with the structural member of a trailer, an elongated flexible member having a coil spring formation on the lower end thereof, the lower end of said spring formation secured to said clamp means, a roller member having a double cone formation rotatably mounted on the upper end of said elongated flexible member adapted to rotate as the same is contacted by a boat hull moved onto the trailer.

4. In a trailer marker device, clamp means for connection with the structural member of a trailer, an elongated flexible member connected at the lower end thereof to said clamp means, a roller member having a double cone formation rotatably mounted on the upper end of said elongated flexible member adapted to rotate as the same is contacted by a boat hull moved onto the trailer.

References Cited in the file of this patent

UNITED STATES PATENTS 2,815,732    Majors _____ Dec. 10, 1957

FOREIGN PATENTS 1,108,652    France _____ Sept. 7, 1955